United States Patent [19]

Kelz

[11] Patent Number: 4,502,460
[45] Date of Patent: Mar. 5, 1985

[54] COTTAGE GRILL

[75] Inventor: Reinhard Kelz, Thornhill, Canada

[73] Assignee: Gypsy Pan Limited, Markham, Canada

[21] Appl. No.: 546,583

[22] Filed: Oct. 28, 1983

[30] Foreign Application Priority Data

Nov. 12, 1982 [CA] Canada .................................. 415378

[51] Int. Cl.³ .............................................. F24C 1/16
[52] U.S. Cl. ..................................... 126/29; 126/9 R; 126/25 R
[58] Field of Search ...................... 126/390, 29, 30, 26, 126/9, 25, 25 A

[56] References Cited

U.S. PATENT DOCUMENTS

| 763,962 | 7/1904 | Clayton et al. ........................ 126/30 |
| 943,569 | 12/1909 | Scamardi ................................ 126/9 |
| 3,526,217 | 9/1970 | Garske et al. ........................ 126/30 |

FOREIGN PATENT DOCUMENTS 1558930  1/1980  United Kingdom .................. 126/30

Primary Examiner—Carroll B. Dority, Jr.
Attorney, Agent, or Firm—Ridout & Maybee

[57] ABSTRACT

A cooking utensil intended, in particular, for use on an open fire on the ground comprises a wok-shaped metal dish, a handle releasably secured to the center of an upwardly-facing cooking surface of the metal dish and three legs releasably secured to the underside of the metal dish for supporting the metal dish on the ground in a cooking position. In another embodiment a second wok-shaped metal dish is provided upon which a fire can be built.

18 Claims, 4 Drawing Figures

COTTAGE GRILL

The invention relates to cooking utensils and is useful in particular, but not exclusively, for cooking utensils intended for use on an open fire.

One of the disadvantages of barbeques, which are in wide-spread use for open-air cooking, is that they require special barbeque briquettes, which are relatively expensive and which are dirty to handle. Barbeques are also bulky and heavy and, therefore, are awkward to transport.

One alternative to the use of a barbeque and barbeque briquettes is the employment of a grill on a fire built on the ground, the fire being fueled with wood or other combustible material and the grill being supported on rocks or any other convenient support.

However, the use of a grill restricts the manner in which food can be cooked, since obviously food cannot be fried or boiled directly on a grill, i.e. without the use of a pan or other receptacle. Also, the food can be adversely affected by the fumes from the burning fuel.

The invention provides a cooking utensil which is intended to be used with a fire built on the ground or alternatively on a second similar utensil for outdoor cooking, the fire being fueled with wood or any conveniently available combustible material.

According to one aspect of the invention, there is provided a cooking utensil comprising a metal dish presenting a cooking surface of upwardly concave shape and means for supporting the dish on the ground in a cooking position. A handle is connected to the metal dish in a position in which the handle extends substantially vertically upwardly above the centre of the cooking surface of a sufficient distance to provide a relatively cool handle surface during normal cooking for removing said dish from its cooking position.

The support means preferably comprise three equi-spaced legs at the underside of the metal dish, in which case the legs are preferably readily detachably secured to the underside of the metal dish, so that the legs can be easily removed to facilitate transportation and storage of the utensil in a compact space.

In another aspect of the invention, a second metal dish is added for building a fire off the ground, this second metal dish also presents a surface of upwardly concave shape and preferably has at least three equi-spaced legs. A first metal dish is provided which is similar to that previously described and which has a cooking surface of upwardly concave shape. The first metal dish preferably also has at least three equispaced legs which removeably rest on the concave surface of the second metal dish. The first metal dish also has a handle for removing this dish from its cooking position, as previously described.

With any of the embodiments of this utensil, there is no necessity to use special fuel, such as barbeque briquettes, so that the mess of handling charcoal can be avoided and fuel can often easily be obtained, for example, by picking up wood in the vicinity of a picnic site.

The food being cooked is shielded from the fumes resulting from the combustion of the fuel by the dish and the food can be cooked, for example, by frying or boiling.

One prior art, and indeed ancient, cooking utensil which has found increasing and widespread acceptance in recent years in Western countries is the Chinese wok, which comprises a metal dish having an upwardly-facing, concave cooking surface and, in many cases, a pair of metal handles riveted to opposite sides of the dish. One disadvanage of the wok is that it is usually necessary to grip both of the handles, i.e. to use two hands, in order to move the wok when the wok contains food. If this is done while the wok is being used on an open fire, it is easy for the user of the wok to hurt his hands, since the handles become hot and are often located directly above underlying charcoal or wood embers and flames.

The present embodiments of the utensil can avoid these problems by having a handle and means for connecting the handle to the metal dish in a position in which the handle extends vertically upwardly above the centre of the cooking surface.

When the utensil is used on an open fire, the handle is shielded from the flames of the fire, and from a substantial amount of the heat of the fire, by the metal dish, and the upper end of the handle, which is preferably spaced a substantial distance from the cooking surface, can be gripped to remove the metal dish from the fire or to adjust the position of the metal dish on the fire.

In an alternative embodiment of the invention a second upwardly concave dish is provided for building a fire. This retains the advantages of the earlier described embodiment of the utensil, and in addition provides a surface off of the ground for building a fire. Such a surface may be needed in some locations such as a patio or parking lot.

In preferred embodiments of the invention, the handle comprises a shaft in readily releasable threaded engagement with a retainer which is fixed at the centre of the cooking surface of the first dish. Consequently, the handle can be easily removed from the dish to reduce the bulk of the utensil and, thus, to facilitate storage and transportation of the utensil.

Similarly, the legs, in the preferred embodiments, readily releasably detach from threaded engagement with the undersurface of the dish to reduce the bulk of the utensil.

The invention will be more readily understood from the following description of the preferred embodiments thereof illustrated, by way of example, with reference to the accompanying drawings, in which.

Figure 1:
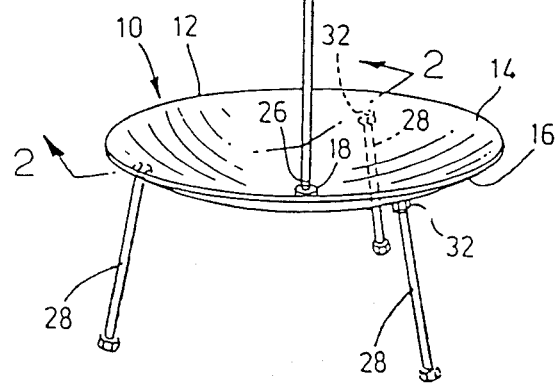
FIG. 1 shows a view in perspective of a cooking utensil.
Figure 2:
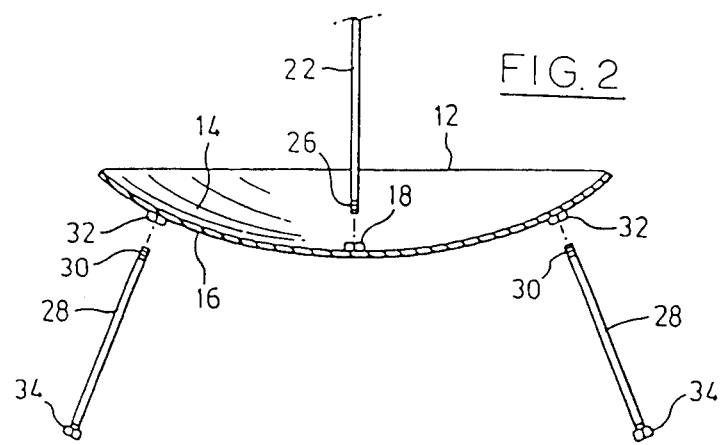
FIG. 2 shows a view taken in cross-section along the line 2—2 of FIG. 1.

The cooking utensil illustrated in the accompanying drawing and indicated generally by reference numeral 10, comprises a wok-shaped metal dish 12 having an upwardly facing, concave cooking surface 14 and an underside 16.

A handle retainer 18 is fixed at the centre of the cooking surface 14 and, in the present embodiment of the invention, is in the form of a bushing or nut welded to the cooking surface 14.

A handle indicated generally by reference numeral 20 comprises a shaft in the form of a metal rod 22 and a grip in the form of a metal ring 24 welded to the upper end of the shaft 22 or any other convenient handle form. The lower end of the shaft 22 is formed with a thread 26 for threaded engagement with the nut 18.

Three legs 28 are equiangularly spaced apart around the centre of the metal dish beneath the metal dish, the legs 28 each comprising a metal rod having a threaded upper end 30 in threaded engagement with a respective leg retainer in the form of a nut 32 welded to the metal dish underside 12 or the legs can be affixed by means of a cold-headed head without a nut.

The legs 28 are each formed at their lower ends with a foot, in the form of a nut 34 fixedly secured by welding and threaded engagement with the lower end of the respective leg 28.

When the above-described utensil is in use, the legs 28 serve to support the metal dish 12 in a cooking position, for example above the burning fuel of an open fire built on the ground, and the dish can then be used, for example, for frying or boiling food. The food is shielded from the fumes of the fire by the metal dish 12 and the three legs 28 readily adapt to irregularities in the ground. When it is desired to adjust the position of the dish on the fire, for example to regulate the cooking temperature, or to remove the dish from the fire, the metal ring 24 can be gripped by hand to enable the cooking utensil 10 to be lifted and moved. This metal ring 24 is shielded from the heat of the fire by the metal dish 12 and, since the handle 20 extends vertically upwardly from the centre of the metal dish, the cooking utensil 10 can be easily lifted and moved using only one hand.

When the cooking utensil 10 is to be stored and/or transported, the handle rod 22 can be unscrewed from the nut 18 and the legs 28 can be unscrewed from the nuts 32, to reduce the bulk of the cooking utensil and the risk of damage to the handle and the legs.

The cooking utensil is not restricted to use on the ground, but can be used, for example, on a fire built in a container or even over a barbeque. Also, the cooking utensil 10 can be used, indoors, or outdoors, on a camping stove or a conventional domestic stove, and by removing the legs 28, and also by removing the handle 20, if required, the dish 12 can be utilized in the manner of a conventional wok with a ring stand.

Instead of providing the nut 26 for anchoring the handle, a handle retainer in the form, for example, of a stem upstanding from the centre of the dish to about the level of the rim of the dish and formed at its upper end with a threaded socket for engaging the lower end of the handle could be employed to avoid contamination by grease and food in the vicinity of the cooking surface.

Figure 4:
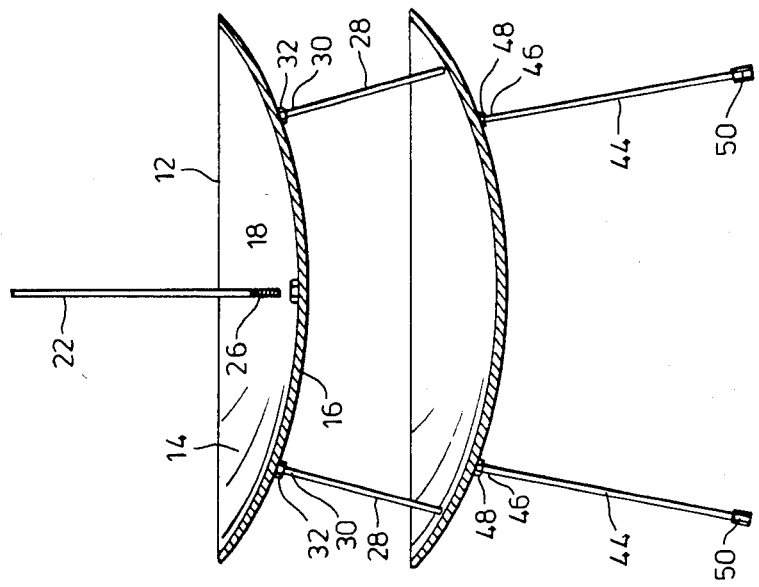
FIG. 4 shows a view taken in cross-section along the line 4—4 of FIG. 3.
Figure 3:
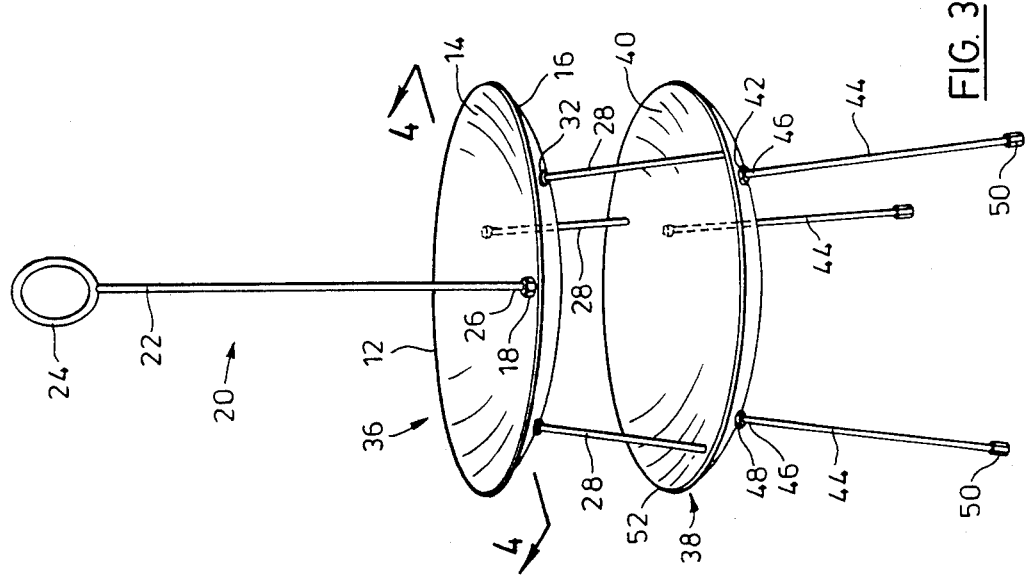
FIG. 3 shows a view in perspective of an alternative embodiment of a cooking utensil which includes a second lower dish for holding a fire.

In the alternative embodiment shown in FIGS. 3 and 4, the first metal dish 36 is essentially the same as the dish 10 shown in FIG. 1 and like parts have been given like numerals. Preferably the first metal dish in this embodiment does not contain feet in the form of the nut 34 as shown on dish 10 in FIG. 1, but it may have a flared head (not shown).

In this embodiment a second metal dish 38 is provided. This second dish is preferably the exact dimensions of the first dish 36 for ease of manufacturing. Therefore only one size part will be needed and the tooling to manufacture both dishes will be the same. Obviously, other forms of second metal dish 38 could be used.

In the preferred form, the second metal dish 38 has an upwardly facing concave surface 40 and an underside 42. Three legs 44 are equiangularly spaced apart around the centre of the metal dish beneath the metal dish. As with dish 36 and dish 10, the legs each comprise a metal rod having a threaded upper end 46 in threaded engagement with a respective leg retainer in the form of a nut 48 welded to the metal dish underside 42 or the legs can be affixed by means of a cold-headed head without a nut.

Like dish 10, but unlike dish 36, the legs 44 are each formed at their lower ends with a foot, in the form of a nut 50 fixedly secured by welding and threaded engagement with the lower end of the respective leg 44. Obviously other suitable feet could be used, such as flared head feet.

In use, the dish 38 is placed on the ground or other suitable location. With this embodiment, a fire is built on the surface 40 of dish 38. The dish 36 is then placed on the upper surface 40 of dish 38 by resting legs 29 on this surface.

The legs 28 should be so placed on dish 38 so that they contact the upper surface 40 within the rim 52 of dish 38 and rest securely thereon.

Cooking with this embodiment then proceeds exactly as described with the one dish embodiment. Dish 36 is removed if necessary from the surface 40 of dish 38 to control cooking.

I claim:

1. A cooking apparatus comprising a metal dish presenting a shallow upper, concave cooking surface and a lower, convex heat absorbing surface, means beneath and detachably connected to the lower surface providing multi-point support for the latter in a stable, free-standing position above a fire supporting surface, a handle located sufficiently vertically above the centre of said upper cooking surface to remain relatively cool during cooking, and vertical rod means extending between the handle and a detachable connection to the dish concentric with the centre of the upper surface, whereby the metal dish is suspended in a stable orientation beneath the handle when the latter is lifted.

2. A cooking apparatus according to claim 1, wherein the support means below the lower surface comprise spaced tripod legs whereby to provide a stable three point support for the dish.

3. A cooking apparatus according to claim 2, wherein the tripod legs are equi-angularly spaced and outwardly splayed.

4. A cooking apparatus according to claim 1, wherein the multiple support points provided by the support means below the lower surface are within a vertical projection of the periphery of the dish.

5. A cooking apparatus according to claim 4, including means for releasably securing said handle to said metal dish.

6. A cooking apparatus according to claim 1, wherein the detachable connection between the rod and the dish is formed by an external thread at the end of the rod, and an internally threaded boss secured in the centre of the dish.

7. A cooking apparatus according to claim 3, wherein the detachable connection between the support means and the lower surface of the dish is formed by external threads on the upper ends of the legs, and internally threaded bosses secured to the dish at equi-angularly spaced points.

8. A cooking apparatus according to claim 1, further comprising a second metal dish presenting a shallow upper, concave fire-supporting surface and a lower, convex surface, means beneath and detachably connected to the lower surface providing multi-point support for the latter in a stable freestanding position above a supporting surface, said support means for the first dish engaging the supporting surface at multiple points within its outer periphery.

9. A cooking apparatus according to claim 5, further comprising a second metal dish presenting a shallow, upper, concave fire-supporting surface and a lower, convex surface, equi-angularly spaced and outwardly splayed legs detachably secured to the lower surface and providing multi-point support for the latter in a stable freestanding position above a supporting surface, said support means for the first dish engaging the fire-supporting surface at equiangularly spaced points within its outer periphery.

10. A cooking apparatus according to claim 9, wherein the legs supporting the second metal dish are longer than the legs supporting the first metal dish.

11. A cooking apparatus according to claim 9, wherein the dishes are substantially identical.

12. A cooking utensil comprising a first metal dish having an upper cooking surface of upwardly concave shape, support means beneath the underside of the metal dish for supporting it in a freestanding cooking position above a fire, and a handle connected to the first metal dish in a position in which said handle extends substantially vertically upwardly above the centre of said cooking surface of a sufficient distance to provide a relatively cool handle surface during normal cooking for removing the dish from its cooking position, the utensil further including a second metal dish having an upper surface of upwardly concave shape for supporting a fire and receiving said support means, and further support means for supporting the underside of said second metal dish above a supporting surface, the support means for both the first and the second metal dishes comprising at least three equispaced tripod legs for each of said dishes at the underside of said dishes.

13. A cooking utensil as claimed in claim 12, wherein the second metal dish has a configuration and dimensions substantially identical to those of the first dish.

14. A cooking utensil as claimed in claim 12, in which the equispaced legs of the first metal dish are spaced so that they removably rest on the concave surface of the second metal dish.

15. A cooking utensil as claimed in claim 13, wherein means are provided for releasably securing the legs to the undersides of both the first and second dishes.

16. A cooking utensil as claimed in claim 15, including means for releasably securing the handle of the second metal dish to said dish.

17. A cooking utensil as claimed in claim 13, in which the legs supporting the second metal dish are longer than the legs supporting the first metal dish.

18. A cooking utensil as claimed in claim 13, wherein the legs are dimensioned so as to support the first metal dish at a suitable cooking height above a fire in the second metal dish when resting on the upper surface of the second dish just within its outer rim.

* * * * *